(12) United States Patent
Miyazawa et al.

(10) Patent No.: US 7,474,070 B2
(45) Date of Patent: Jan. 6, 2009

(54) ELECTRIC POWER STEERING APPARATUS

(75) Inventors: Yasushi Miyazawa, Maebashi (JP);
Keiji Sato, Maebashi (JP)

(73) Assignee: NSK Ltd., Tokyo (JP)

( * ) Notice: Subject to any disclaimer, the term of this patent is extended or adjusted under 35 U.S.C. 154(b) by 124 days.

(21) Appl. No.: 11/709,024

(22) Filed: Feb. 22, 2007

(65) Prior Publication Data

US 2007/0205734 A1 Sep. 6, 2007

(30) Foreign Application Priority Data

Feb. 22, 2006 (JP) .............................. 2006-045573

(51) Int. Cl.
*H02P 7/00* (2006.01)
*H02K 17/32* (2006.01)
*B62D 5/00* (2006.01)

(52) U.S. Cl. ..................... 318/432; 318/434; 318/437; 361/23; 361/87; 180/443; 180/446; 701/29; 701/41; 701/42

(58) Field of Classification Search ................ 318/430, 318/432, 434, 437, 638; 361/23, 87; 701/29, 701/41, 42; 180/446, 443
See application file for complete search history.

(56) References Cited

U.S. PATENT DOCUMENTS

| 4,940,102 | A | * | 7/1990 | Morishita | ................... | 180/446 |
|---|---|---|---|---|---|---|
| 4,956,590 | A | | 9/1990 | Phillips | | |
| 5,039,926 | A | * | 8/1991 | Morishita et al. | ............ | 318/434 |
| 5,682,314 | A | * | 10/1997 | Nishino et al. | ................ | 701/29 |
| 5,889,376 | A | * | 3/1999 | Takatsuka et al. | ............ | 318/434 |
| 5,969,919 | A | * | 10/1999 | Kobayashi et al. | ............ | 361/23 |
| 6,107,926 | A | * | 8/2000 | Kifuku et al. | ................ | 340/650 |
| 6,330,140 | B1 | * | 12/2001 | Wilson-Jones et al. | ........ | 361/87 |
| 6,332,506 | B1 | * | 12/2001 | Kifuku | ........................ | 180/443 |
| 6,439,336 | B2 | * | 8/2002 | Noro et al. | ................... | 180/404 |
| 6,456,090 | B1 | * | 9/2002 | Ishikawa et al. | ............ | 324/546 |
| 6,594,125 | B2 | * | 7/2003 | Dollar, II | ........................ | 361/7 |
| 6,644,433 | B2 | * | 11/2003 | Sato | ........................... | 180/446 |
| 6,907,334 | B2 | * | 6/2005 | Yoshida et al. | ................ | 701/41 |
| 7,019,486 | B1 | * | 3/2006 | Kifuku et al. | ................ | 318/806 |
| 7,161,317 | B2 | * | 1/2007 | Matsushita et al. | .......... | 318/432 |
| 7,181,983 | B2 | * | 2/2007 | Paek | ..................... | 73/862.193 |
| 7,187,153 | B2 | * | 3/2007 | Imagawa et al. | ............ | 318/638 |

FOREIGN PATENT DOCUMENTS

EP 0 984 256 A2 3/2000

(Continued)

*Primary Examiner*—Paul Ip
(74) *Attorney, Agent, or Firm*—Sughrue Mion, PLLC

(57) ABSTRACT

A torque detection portion includes a first arm having a detection coil L1 and a resistor R1, and a second arm having a detection coil L2 and a resistor R2. When a test mode is set, a reference voltage $V_{ref}$ having an abnormal value is outputted to a monitoring portion 13. An abnormal condition is intentionally caused in the monitoring portion 13. A main torque signal $V_{tm}$ is compared with a sub torque signal $V_{ts}$ in the monitoring portion 13. When the reference voltage $V_{ref}$ set in the monitoring portion 13 has the abnormal value, a sub torque signal $V_{ts}$ having a level of 0 ($V_{ts}=0$) is forcibly outputted in a normal condition. Then the signal $V_{tm}$ is equal to the signal $V_{ts}$, the monitoring portion 13 determines that a shortcircuit occurs between a main torque signal line and a sub torque signal line.

6 Claims, 6 Drawing Sheets

FOREIGN PATENT DOCUMENTS

| | | |
|---|---|---|
| EP | 1 095 841 A2 | 5/2001 |
| EP | 1 426 749 A1 | 6/2004 |
| EP | 1 595 767 A2 | 11/2005 |
| JP | 2002-48656 A | 2/2002 |
| JP | 3664055 B2 | 4/2005 |

* cited by examiner

US 7,474,070 B2

ELECTRIC POWER STEERING APPARATUS

BACKGROUND OF THE INVENTION

1. Field of the Invention

This invention relates to an electric power steering apparatus and, more particularly, to an electric power steering apparatus enabled to detect a failure of a torque sensor incorporated in an electric power steering apparatus, especially, a failure of a shortcircuit of a pair of detection coils detecting steering torque.

2. Description of Related Art

A non-contact torque sensor is known, having a torque detection portion adapted to convert twist motion of a torsion bar, which is proportional to steering torque, into change in inductance of a pair of detection coils, a bridge circuit configured by a pair of detection coils and a pair of resistors to output a detection signal corresponding to change in the inductance, a main torque amplifier amplifying a main torque signal outputted by the bridge circuit, and a sub torque amplifier amplifying a sub torque signal outputted by the bridge circuit.

To enhance the fail safe function of the torque sensor, it has been desired to configure the electric power steering apparatus to automatically perform periodical operation tests on the torque sensor at every lapse of a predetermined period, for example, at initial diagnosis of a control unit of the electric power steering apparatus after an ignition key is turned to an ON-position, or during an operating state.

The torque sensor has a drawback in that torque cannot accurately be detected, especially, at occurrence of an abnormality, for example, at reduction in the amplitude of an AC voltage signal supplied to the bridge circuit constituted by a pair of detection coils and a pair of resistors in the torque sensor for some cause.

As a countermeasure against this drawback, it has been proposed a torque detection circuit which is suitable for use in the above torque sensor and which has a monitoring portion enabled to monitor the amplitude of an AC voltage signal to be supplied to the bridge circuit and also enabled to determine whether the torque detection circuit itself normally operates (see Japanese Patent Unexamined Publication JP-A-2002-48656)

FIG. 6 is a block diagram illustrating the configurations of the conventional torque detection circuit 100 and a peripheral circuit incorporated in a control circuit 200 that controls an electric power steering apparatus (not shown) associated with the torque detection circuit 100. An AC voltage $V_{osc}$ is supplied to a bridge circuit constituted by a first arm, which has a detection coil L1 and a resistor R1, and a second arm having a detection coil L2 and a resistor R2. A main torque signal $V_{tm}$ is obtained by amplifying a differential voltage $V_{def}$ and a voltage outputted from the connecting part between the detection coil L2 and the resistor R2 of the second arm through a main torque amplifying circuit. Note that the differential voltage $V_{def}$ represents the difference between a voltage outputted from the connecting part between the detection coil L1 and the resistor R1 of the first arm. Additionally, a sub torque signal $V_{ts}$ is obtained by amplifying the differential voltage $V_{def}$ through a sub torque amplifying circuit.

The torque detection circuit 100 is configured so that an abnormality thereof is detected by comparing the detected main torque signal $V_{tm}$ with the detected sub torque signal $V_{ts}$ at an abnormality detection portion 105, and that when an abnormality is detected, the torque detection circuit 100 outputs an abnormality detection signal to change a mode of an electric power steering apparatus into a fail safe mode. Additionally, different reference voltages are supplied to a monitoring portion 103 from a reference voltage generation circuit (not shown). Thus, the monitoring portion 103 monitors whether an abnormality of the amplitude of the AC voltage signal $V_{osc}$ occurs. Also, the monitoring portion 103 has a self-diagnostic mode to determine whether the monitoring portion 103 normally operates (see the JP-A-2002-48656).

In a case where a failure of an electric power steering apparatus occurs, usually, a main body and a control unit of the electric power steering apparatus are replaced at a service station. These collected units causing failures are analyzed at a manufacturing department. Results are used for study on measures to prevent recurrences of the failures and for future development.

Meanwhile, among various failures, a shortcircuit failure occurring between a main torque signal line and a sub torque signal line of a torque sensor is poor in reproducibility. Thus, even when the collected unit is operated under the same conditions as those under which a failure has occurred, the apparatus often fails to reproduce the failure. Fails being poor in reproducibility are not necessarily the shortcircuit failures occurring between the main torque signal line and the sub torque signal line. Therefore, the causes of the failure should be determined by performing various tests and checks. However, it takes significant cost and time to identify the failure as a shortcircuit failure occurring between the main torque signal line and the sub torque signal line. Accordingly, it has been earnestly desired to easily identify the failure as a shortcircuit failure occurring between torque signal lines.

Hitherto, in a case where a failure of the torque sensor is detected at initial diagnosis performed by the control unit just after the ignition key is turned to the ON-position, the mode of the apparatus has been changed to the fail safe mode in which a steering assisted by a motor is stopped. However, when the shortcircuit failure occurring between the main torque signal line and the sub torque signal line, neither a main torque signal nor a sub torque signal represents an abnormal value. Thus, in such a case, even when the steering assist is continued by using, for example, a main torque signal, no troubles occur.

SUMMARY OF THE INVENTION

The configuration of the monitoring portion monitors an abnormality in the amplitude of an AC voltage $V_{osc}$ to be supplied to the torque detection circuit and an operation in the self-diagnosis mode of the monitoring portion have been studied in detail. Consequently, it has been found that a shortcircuit failure occurring between the main torque signal line and the sub torque signal line can be detected.

An object of the invention is to provide a shortcircuit failure detection device, which detects a shortcircuit failure occurring between a main torque signal line and a sub torque signal line, by enhancing the function of the monitoring portion of the torque detection circuit.

To solve the above problems, according to the invention, there is provided an electric power steering apparatus, comprising a torque detection unit comprising:

a torque detection element comprising a pair of detection coils of which impedances change in accordance with torque;

a torque detection portion comprising a monitoring portion which monitors the torque detection element; and a shortcircuit failure detection portion which detects a shortcircuit failure occurring between a main torque signal line and a sub torque signal line of the detection coils, wherein the shortcircuit failure detection portion detects the shortcircuit failure occurring between the main torque signal line and the sub torque signal line by comparing a main torque signal and a sub torque signal, which are outputted from the torque detection portion when an abnormal condition is intentionally set in the monitoring portion.

According to a second aspect of the invention, as set forth in the first aspect of the invention, it is preferable that the torque sensor further comprises a reference voltage generation circuit which outputs a particular reference voltage, which differs from a standard reference voltage, to the monitoring portion and when a test mode, in which a torque detection circuit is tested, is set, the abnormal condition is intentionally set in the monitoring portion by setting the particular reference voltage therein.

According to a third aspect of the invention, as set forth in the second aspect of the invention, it is preferable that the particular reference voltage, which is set in the monitoring portion when the test mode is set, exceeds the standard reference voltage.

According to a fourth aspect of the invention, as set forth in the first aspect of the invention, it is preferable that the monitoring portion is configured so that when an abnormal condition is set therein by intentionally setting the particular reference voltage therein, the sub torque signal line is grounded.

According to a fifth aspect of the invention, as set forth in the first aspect of the invention, it is preferable that the shortcircuit failure detection portion determines that the shortcircuit failure occurring between the main torque signal line and the sub torque signal line occurs in a case where a test mode is set, where an abnormal condition is set in the monitoring portion by setting a particular reference voltage exceeding a standard reference voltage therein, and where a main torque signal voltage and a sub torque signal voltage outputted from the torque detection portion are equal to each other.

According to a sixth aspect of the invention, as set forth in the first aspect of the invention, it is preferable that when the shortcircuit failure is detected, the torque sensor changes a mode thereof into a fail safe mode.

According to the invention, the monitoring portion fundamentally monitors the value of an AC voltage supplied to the torque detection portion. However, the monitoring portion has a self-diagnosis function of diagnosing itself. When a reference voltage differing from a standard reference voltage in the monitoring portion, the monitoring portion can detect an abnormality occurring in the monitoring portion itself by comparing a main torque signal and a sub torque signal outputted from the torque detection portion. The invention applies the self-diagnosis function to the detection of a shortcircuit failure occurring between the main torque signal line and the sub torque signal line. That is, the particular reference voltage, which is higher than the standard reference voltage, is set in the monitoring portion to intentionally set an abnormal condition therein. Also, when a main torque signal voltage and a sub torque signal voltage are equal in value to each other in this condition, it is determined that a shortcircuit failure occurring between the main torque signal line and the sub torque signal line occurs.

Consequently, the apparatus according to the invention can easily detect a shortcircuit failure occurring between the main torque signal line and the sub torque signal line, which cannot be detected by the conventional failure detection means.

DETAILED DESCRIPTION OF EXEMPLARY EMBODIMENTS OF THE INVENTION EMBODIMENTS

Hereinafter, a torque detection portion of a torque sensor according to an embodiment of the invention is described with reference to an example of the application of the torque detection portion to a vehicle electric power steering apparatus.

[Configurations of Torque Detection Portion and Peripheral Circuits thereof]

Figure 1:
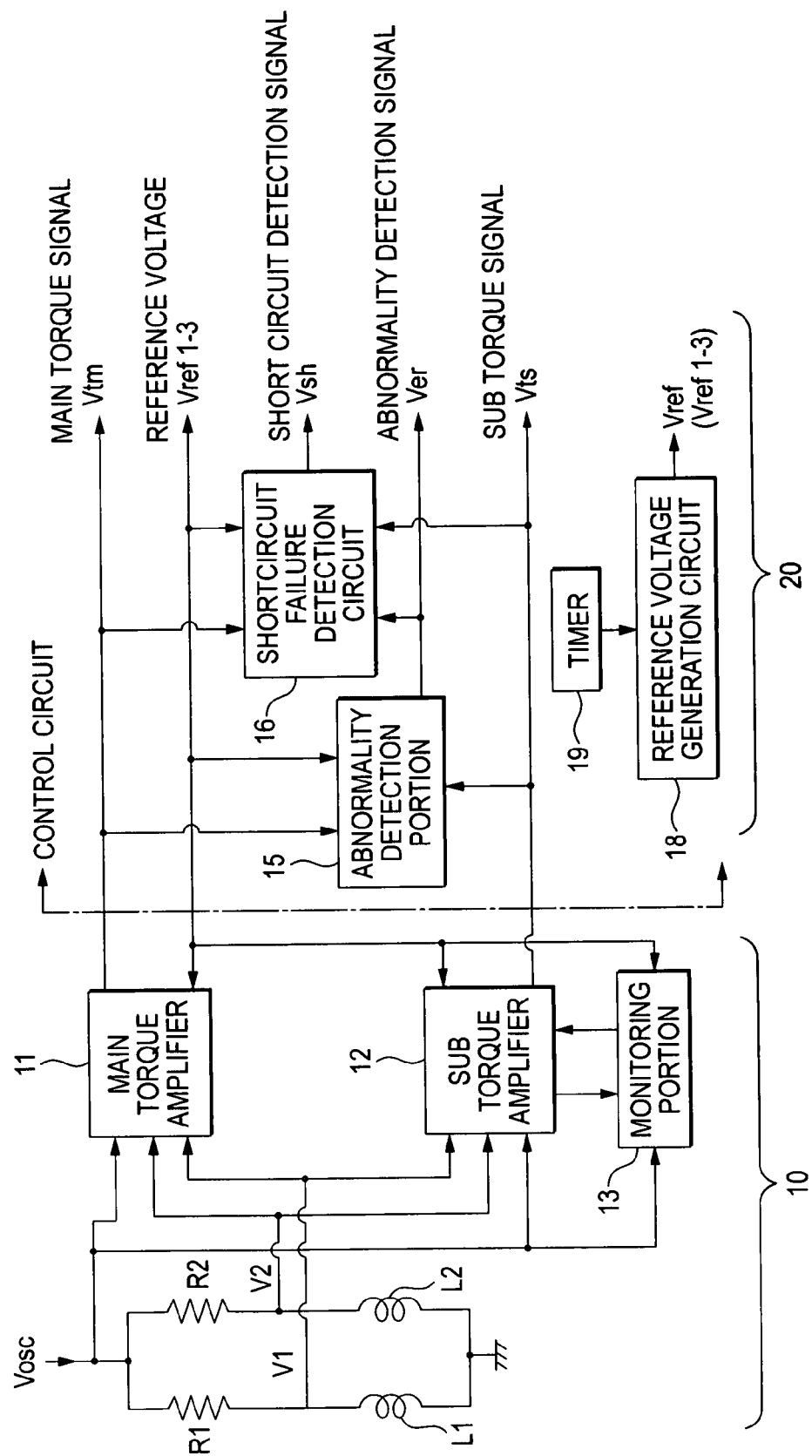
FIG. 1 is a block diagram illustrating the configuration of a torque detection portion according to an embodiment of the invention.

FIG. 1 is a circuit block diagram illustrating the configuration of a torque detection portion 10 according to the present embodiment of the invention and also illustrating the configuration of peripheral circuits of the torque detection portion 10. The peripheral circuits are provided in a control circuit 20 of an electric power steering apparatus (not shown) and include an abnormality detection portion 15, a shortcircuit failure detection portion 16, a reference voltage generation circuit 18, and a timer 19.

[Torque Detection Portion]

The torque detection portion 10 includes a bridge circuit which has a first arm including a detection coil L1 and a resistor R1 and also has a second arm including a detection coil L2 and a resistor R2, and also includes a main torque amplifier 11, a sub torque amplifier 12, and a monitoring portion 13. An AC voltage $V_{osc}$ is supplied from a power supply (not shown) of the control circuit 20 of the electric power steering apparatus to the monitoring portion 13.

A voltage V1 outputted from the connecting part between the detection coil L1 and the resistor R1 of the first arm of the torque detection portion 10. A voltage V2 outputted from the connecting part between the detection coil L2 and the resistor R2 of the second arm thereof. The voltages V1 and V2 are inputted to the main torque amplifier 11. Then, a voltage $V_{def}$ representing the difference between the voltages V1 and V2 inputted to the main torque amplifier 11 is amplified. Subsequently, a signal representing the amplified voltage is outputted therefrom as a main torque signal $V_{tm}$. The output voltages V1 and V2 are inputted to the sub torque amplifier 12. Then, a voltage $V_{def}$ representing the difference between the voltages V1 and V2 inputted to the sub torque amplifier 12 is amplified. Subsequently, a signal representing the amplified voltage is outputted therefrom as a sub torque signal $V_{ts}$.

[Monitoring Portion]

The monitoring portion 13 is fundamentally operative to monitor an abnormality of the amplitude of the AC voltage signal $V_{osc}$ supplied to the bridge circuit by comparing the amplitude of the AC voltage signal $V_{osc}$ with that of a signal representing the reference voltage (see the JP-A-2002-48656). Additionally, the monitoring portion 13 has the self-diagnosis function of diagnosing whether the monitoring portion 13 works normally. The invention applies the self-diagnosis function of the monitoring portion 13 to the detection of a shortcircuit failure occurring between the main torque signal line and the sub torque signal. The detection of a shortcircuit failure will be described in detail later.

Figure 3:
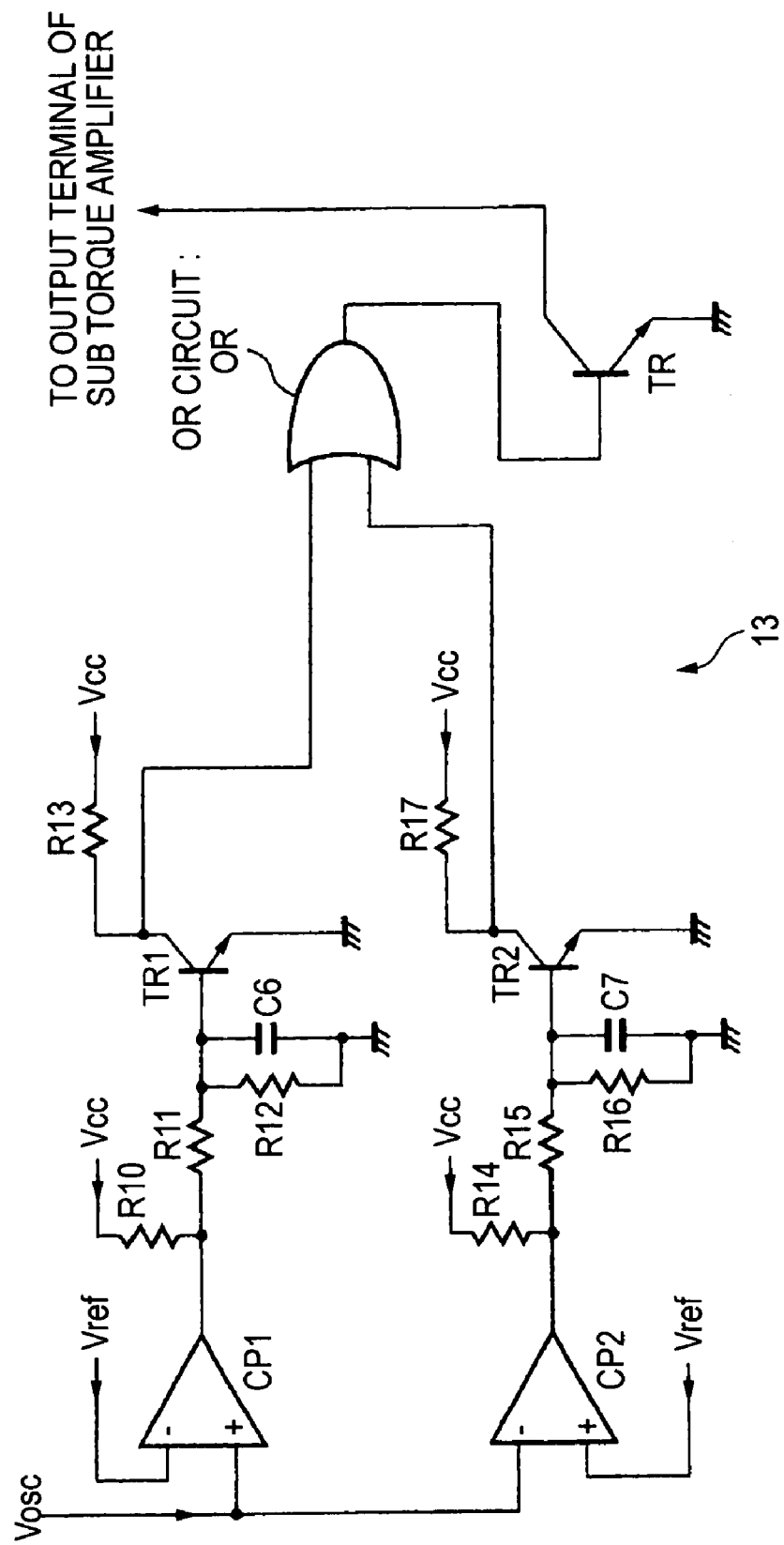
FIG. 3 is a block diagram illustrating the configuration of a monitoring part of the torque detection portion.

FIG. 3 is a block diagram illustrating the configuration of the monitoring portion 13. Hereinafter, the self-diagnosis function of the monitoring portion 13 is described.

The AC voltage $V_{osc}$ and a reference voltage $V_{ref}$ representing a threshold value exceeding a peak value of the normal AC voltage $V_{osc}$ are inputted to each of comparators CP1 and CP2. When the peak value of the normal AC voltage is, for example, 4.8 V (at a positive terminal (+)), the reference voltage $V_{ref}$ representing a threshold value exceeding this peak value is set to be 6.2V ($V_{ref}$=6.2 (=5.0 +1.2)). This is because self-diagnosis is performed by changing a normal threshold value corresponding to the monitoring portion 13 to intentionally set an abnormal condition in the monitoring portion 13.

According to this setting, the amplitude of the AC voltage signal $V_{osc}$ inputted to the positive terminal of the comparator CP1 is equal to or less than that of the reference voltage signal $V_{ref}$. Thus, the level of an output signal of the comparator CP1 is 0, so that a transistor TR1 is brought into an OFF-state. Also, the level of an output signal of the comparator CP2 is 0, so that a transistor TR2 is brought into an OFF-state. Consequently, an output signal of an OR-circuit is on (corresponding to a binary value of "1"), so that the transistor TR is brought into a conduction state. Thus, an output signal of the sub torque amplifier 12 is grounded, so that a sub torque signal $V_{ts}$, whose level is 0, is outputted ($V_{ts}$=0). This sub torque signal $V_{ts}$ indicates that an abnormality occurs in the monitoring portion 13. Conversely, when a sub torque signal $V_{ts}$, whose level is not 0, is outputted ($V_{ts}$≠0), this sub torque signal $V_{ts}$ indicates that the monitoring portion 13 is normal.

In this case, an abnormal condition is intentionally set in the monitoring portion 13 by changing the threshold value in a test mode to perform the self-diagnosis of the monitoring portion 13. Therefore, according to the fact that a signal ($V_{ts}$=0) indicating the occurrence of an abnormality is outputted from the monitoring portion 13, it can be determined that the monitoring portion 13 normally operates. Conversely, when a signal ($V_{ts}$≠0) indicating that the monitoring portion 13 is normal, it can be determined that an abnormality occurs in the monitoring portion 13.

[Abnormality Detection Portion]

The abnormality detection portion 15 provided at the side of the control circuit is configured so that in an ordinary condition, that is, when a test mode for diagnosing the condition of the control circuit of the power steering apparatus, which is described later, is not set, a main torque signal $V_{tm}$ is compared with a sub torque signal $V_{ts}$ in the abnormality detection portion 15. The abnormality detection portion 15 detects an abnormality of the torque detection portion 10 according to a result of the comparison.

Figure 2:
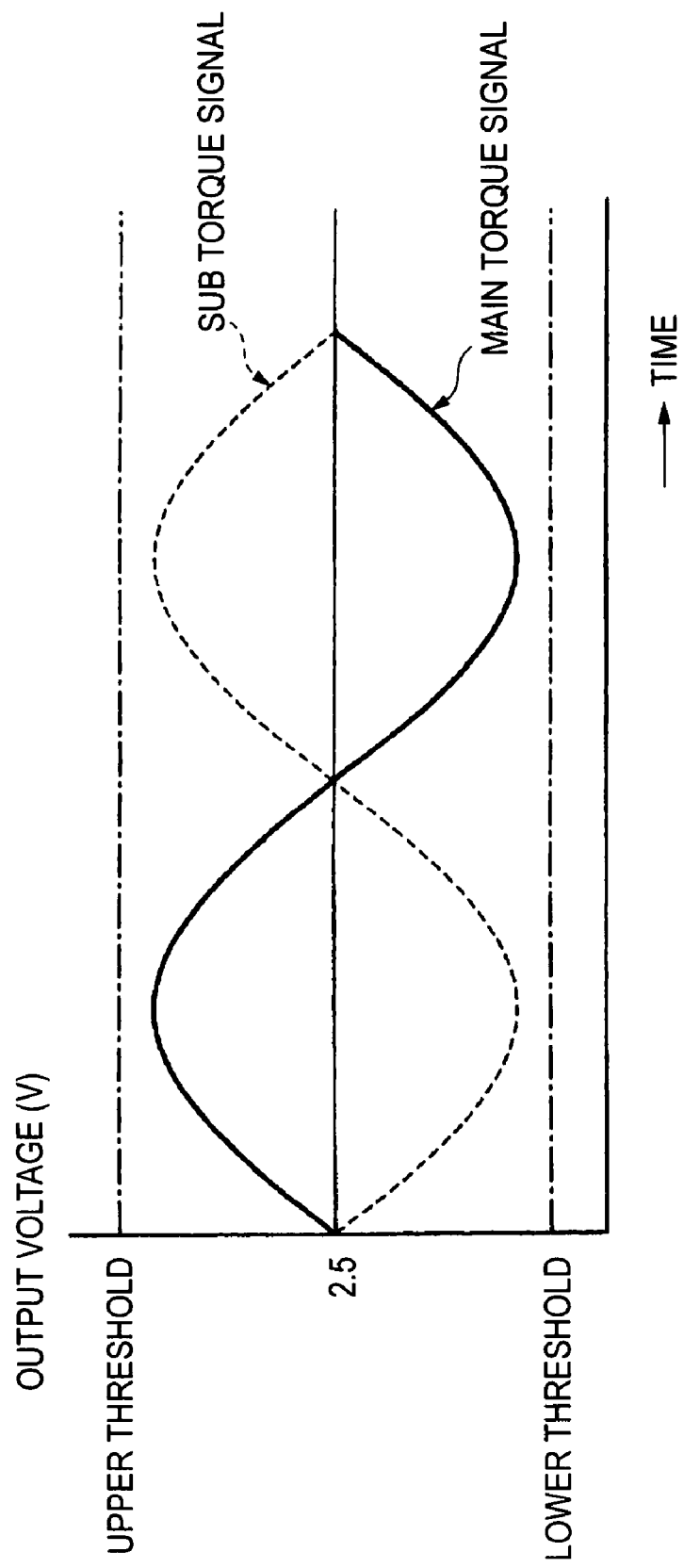
FIG. 2 is a waveform chart illustrating an example of the waveform of each of a main torque signal and a sub torque signal outputted from the torque detection portion.

That is, when the torque detection portion 10 is normal, the main torque signal $V_{tm}$ and the sub torque signal $V_{ts}$ are outputted to respectively have waveforms each of which is inversion of another one with respect to an output voltage of 2.5 V, as shown in FIG. 2, in a state in which no torque is generated. However, when it is found as a result of the comparison between the main torque signal $V_{tm}$ and the sub torque signal $V_{ts}$ that the outputted signals $V_{tm}$ and $V_{ts}$ are not inversion each other with respect to 2.5 V, it is determined that a failure of one of the detection coils L1, L2, the resistors R1, R2, the main torque amplifier 11, and the sub torque amplifier 12 is caused. Also, an abnormality detection signal $V_{er}$ is outputted from the abnormality detection portion 51.

When the abnormality detection portion 15 detects that all the detection coils L1, L2, the resistors R1, R2, the main torque amplifier 11, and the sub torque amplifier 12 are normal, a signal representing a normal condition is outputted to the control circuit of the power steering apparatus (not shown). Then, computation of a steering assist command according to the main torque signal $V_{tm}$, and a steering assist operation are performed. When the abnormality detection portion 15 detects an abnormality, an abnormality detection signal $V_{er}$ indicating occurrence of an abnormal condition is outputted to the control circuit of the electric power steering apparatus (not shown) Thus, the mode thereof is changed into a fail safe mode.

[Shortcircuit Failure Detection Portion]

The shortcircuit failure detection portion 16 provided at the side of the control circuit is operated to detect a shortcircuit occurring between the main torque signal line and the sub torque signal line when the test mode is set. A shortcircuit detection process performed by the shortcircuit failure detection portion 16 will be described later in detail.

[Self-Diagnosis Process Performed by Monitoring Portion]

As described previously, the monitoring portion 13 is fundamentally operative to monitor an abnormality in the amplitude of the AC voltage signal $V_{osc}$ supplied to the bridge circuit. Also, the monitoring portion 13 has the self-diagnosis function. A self-diagnosis process by the monitoring portion 13 in a test mode set just after the ignition key is turned to the ON-position (that is, a process of determining whether the monitoring portion 13 normally operates) is described.

Hereinafter, the self-diagnosis process, which is performed by the monitoring portion 13 when a test mode is set, is described. First, it is assumed for performing the self-diagnosis process that the test mode is set, that a normal AC voltage $V_{osc}$ is outputted from a power supply for the torque detection portion, and that the reference voltage generation circuit 18 normally operates to output reference voltages $V_{ref1}$ to $V_{ref3}$, which are inputted to each of the comparators CP1 and CP2 (see FIG. 3) of the monitoring portion 13.

Reasons for inputting a three-level reference voltage, whose value changes stepwise from $V_{ref1}$ to $V_{ref3}$, to the monitoring portion 13 in the test mode are that a failure state is caused in the monitoring portion 13 by intentionally inputting a reference voltage (having an abnormal value) differing from an ordinary reference voltage (having a normal value), and that the main torque signal $V_{tm}$ and the sub torque signal $V_{ts}$ respectively outputted from the main torque amplifier 11 and the sub torque amplifier 12 are compared with each other at the abnormality detection portion 15 to perform the self-diagnosis for detecting an abnormality of the monitoring portion 13.

When the test mode is set, a three-level reference voltage, whose value sequentially changes stepwise among preliminarily set three different values as time passes, is inputted, as time passes, under the control of the timer 19 from the reference voltage generation circuit 18 provided in the control circuit of the electric power steering apparatus (not shown) to each of the monitoring portion 13, the main torque amplifier 11, and the sub torque amplifier 12.

The value of the three-level reference voltage $V_{ref}$ outputted from the reference voltage generation circuit 18 changes among the following three values. That is, for an example, a first reference voltage value $V_{ref1}$=3.3 V (a normal value), a second reference voltage value $V_{ref2}$=5.0 V (an abnormal value), and a third reference voltage $V_{ref3}$=0.0 V (a voltage value corresponding to an abnormal value of the reference voltage). The following description is made by assuming that the reference voltage has these values. Incidentally, the reference voltage having these values is an example of the reference voltage. The reference voltage according to the invention is not limited to this example.

The monitoring portion 13, which determines whether an inputted reference voltage $V_{ref}$ (whose value ranges from $V_{ref1}$ to $V_{ref3}$) has a normal value or an abnormal value, is connected to the sub torque amplifier 12. When the value of the reference voltage $V_{ref}$ (whose value ranges from $V_{ref1}$ to $V_{ref3}$) has an abnormal value (for example, $V_{ref2}$=5.0 V), the level of the sub torque signal $V_{ts}$ is 0 ($V_{ts}$=0). As is apparent from the description of the monitoring portion 13, which has been made with reference to FIG. 3, the levels of output signals of the comparators CP1 and CP2 of the monitoring portion 13 are 0. Additionally, the transistors TR1 and TR2 are off. Thus, an output signal of the OR-circuit is on (corresponding to a binary value of "1"), so that the transistor TR is brought into a conduction state. Consequently, an output signal of the sub torque amplifier 12 is grounded, so that the level of the sub torque signal $V_{ts}$ is forcibly set to be 0 ($V_{ts}$=0)

When all the following conditions (1) to (3) are met, the abnormality detection portion 15 determines that the monitoring portion 13 is normal. When at least one of the following conditions (1) to (3) is met, and when this state continues for a predetermined time, the abnormality detection portion 15 determines that the monitoring portion 13 is abnormal.

(1) In a case where the reference voltage is set at the first reference voltage value $V_{ref1}$ in the monitoring portion 13, the level of each of the main torque signal and the sub torque signal inputted to the abnormality detection portion 15 ranges between the upper limit value $V_{thu}$ and the lower limit value $V_{thd}$ of preliminarily set criterion values (or threshold values). Also, the absolute value of a value obtained by subtracting the difference in level between the main torque signal and the sub torque signal from a predetermined value $V_c$ is less than the lower limit value $V_{thd}$ of the preliminarily set criterion reference value.

(2) In a case where the reference voltage is set at the second reference voltage value $V_{ref2}$ in the monitoring portion 13, the level of the sub torque signal inputted to the abnormality detection portion 15 is less than the lower limit value $V_{thd}$ of the preliminarily set criterion reference value.

(3) In a case where the reference voltage is set at the third reference voltage value $V_{ref3}$ in the monitoring portion 13, the level of the sub torque signal inputted to the abnormality detection portion 15 is less than the lower limit value $V_{thd}$ of the preliminarily set criterion reference value.

In the following description, it is assumed that the upper limit value $V_{thu}$ of the abnormality criterion value (or threshold value) is set at 4.7 V ($V_{thu}$=4.7), that the lower limit value $V_{thd}$ thereof is set at 0.3V ($V_{thd}$=0.3), and that the predetermined value $V_c$ is set at 5 V ($V_c$=5).

[Step 1]

The abnormality detection portion 15 determines whether the condition (1) is satisfied. An AC voltage level $V_{osc}$ is set at 9 V ($V_{osc}$=9 V) as a power supply voltage for the torque detection portion 10. The reference voltage having the first reference voltage level $V_{ref1}$ ($V_{ref1}$=3.3 V (a normal value)) is outputted from the reference voltage generation circuit 18 and is set in the monitoring portion 13. The abnormality detection portion 15 determines whether each of the main torque signal $V_{tm}$ and the sub torque signal $V_{ts}$ ranges between the upper limit value $V_{thu}$ and the lower limit value $V_{thd}$ of the following criterion value.

$(V_{thu}: 4.7) > V_{tm} > (V_{thd}: 0.3)$, $(V_{thu}: 4.7) > V_{ts} > (V_{thd}: 0.3)$, $|(V_c: 5) - V_{tm} - V_{ts}| < 0.3$ When a result of the determination made by the abnormality detection portion 15 reveals that each of the main torque signal $V_{tm}$ and the sub torque signal $V_{ts}$ is within the above range from the criterion value, the abnormality detection portion 15 determines that the monitoring portion 13 is normal.

When the abnormality detection portion 15 determines that each of the main torque signal $V_{tm}$ and the sub torque signal $V_{ts}$ is outside the range between the upper limit value $V_{thu}$ of the abnormality criterion value and the lower limit value $V_{thd}$ thereof, that is, within the following range, and where this state continues for 10 ms, the abnormality detection portion 15 also determines that the monitoring portion 13 is abnormal.

$(V_{thu}: 4.7) \leq V_{tm}$, or $V_{tm} \leq (V_{thd}: 0.3)$, $(V_{thu}: 4.7) \leq V_{ts}$, or $V_{ts} < (V_{thd}: 0.3)$, $|(V_c: 5) - V_{tm} - V_{ts}| \geq 0.3$

[Step 2]

The abnormality detection portion 15 determines whether the condition (2) is satisfied. When a time period of 45 ms has elapsed since an abnormality detection operation is started, the reference voltage is set at the second reference voltage value $V_{ref2}$ ($V_{ref2}$: 5.0 V (an abnormal value)) in the monitoring portion 13. The abnormality detection portion 15 determines whether the level of the sub torque signal $V_{ts}$ satisfies the following inequality: $V_{ts} < V_{thd}$ (the lower limit value of the criterion value $V_{thd}$: 0.3). When it is confirmed that this inequality is satisfied, the abnormality detection portion 15 determines that the monitoring portion 13 is normal.

When the abnormality detection portion 15 determines that the level of the sub torque signal $V_{ts}$ does not meet the above inequality relating to the lower limit $V_{thd}$ of the abnormality criterion value, that is, the level of the sub torque signal $V_{ts}$ meets the following inequality: $V_{ts} \geq V_{thd}$ ($V_{thd}$: 0.3), and where this state continues for 10 ms, the abnormality detection portion 15 also determines that the monitoring portion 13 is abnormal.

[Step 3]

The abnormality detection portion 15 determines whether the condition (3) is satisfied. When a time period of 90 ms has elapsed since an abnormality detection operation is started, the reference voltage is set at the third reference voltage value $V_{ref3}$ ($V_{ref3}$: 3.0 V (an abnormal value)) in the monitoring portion 13. The abnormality detection portion 15 determines whether the level of the sub torque signal $V_{ts}$ satisfies the following inequality: $V_{ts} < V_{thd}$ (the lower limit value $V_{thd}$: 0.3). When it is confirmed that this inequality is satisfied, the abnormality detection portion 15 determines that the monitoring portion 13 is normal.

When the abnormality detection portion 15 determines that the level of the sub torque signal $V_{ts}$ does not meet the above inequality relating to the lower limit $V_{thd}$ of the abnormality criterion value, that is, the level of the sub torque signal $V_{ts}$ meets the following inequality: $V_{ts} \geq V_{thd}$ ($V_{thd}$: 0.3), and where this state continues for 10 ms, the abnormality detection portion 15 also determines that the monitoring portion 13 is abnormal.

[Return to Step 1]

When a time period of 135 ms has elapsed since an abnormality detection operation is started, the process returns to step 1.

Figure 4:
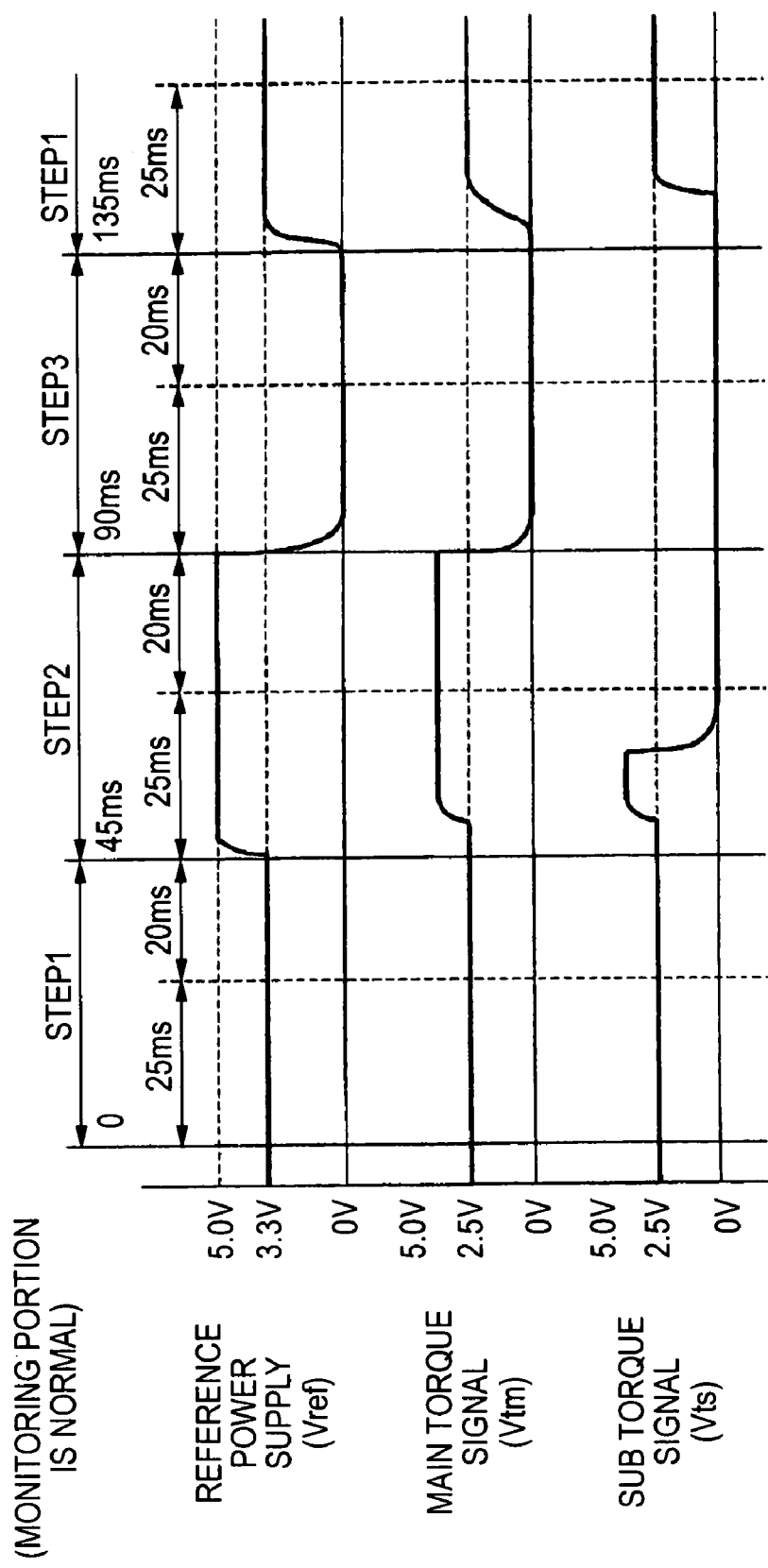
FIG. 4 is a timing chart illustrating a reference voltage $V_{ref}$, a main torque signal $V_{tm}$, and a sub torque signal $V_{ts}$ in a self-diagnosis mode of the monitoring part in a case where the monitoring part itself is normal.
Figure 5:
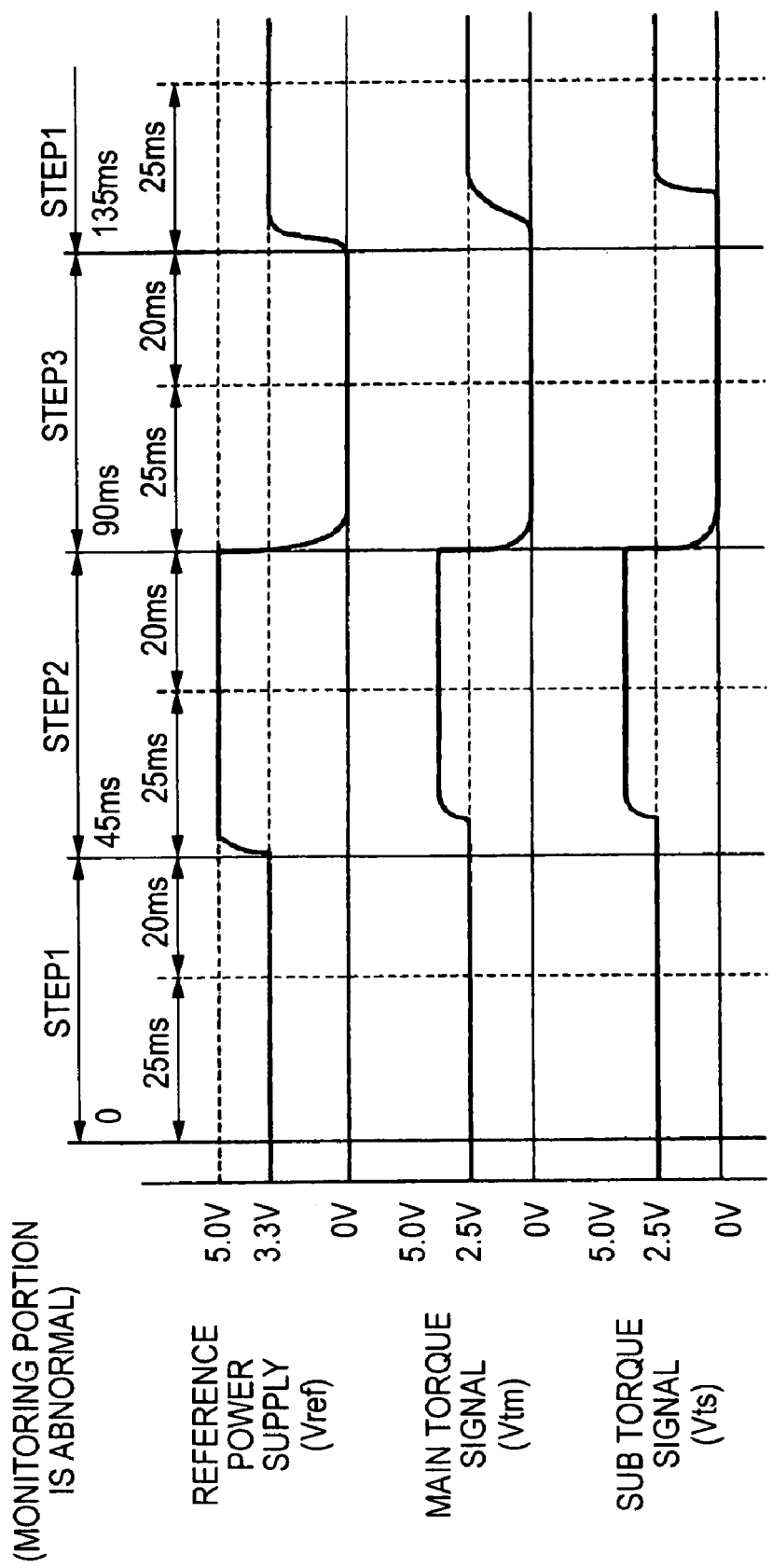
FIG. 5 is a timing chart illustrating a reference voltage $V_{ref}$, a main torque signal $V_{tm}$, and a sub torque signal $V_{ts}$ in the self-diagnosis mode of the monitoring part in a case where the monitoring part itself is abnormal.
Figure 6:
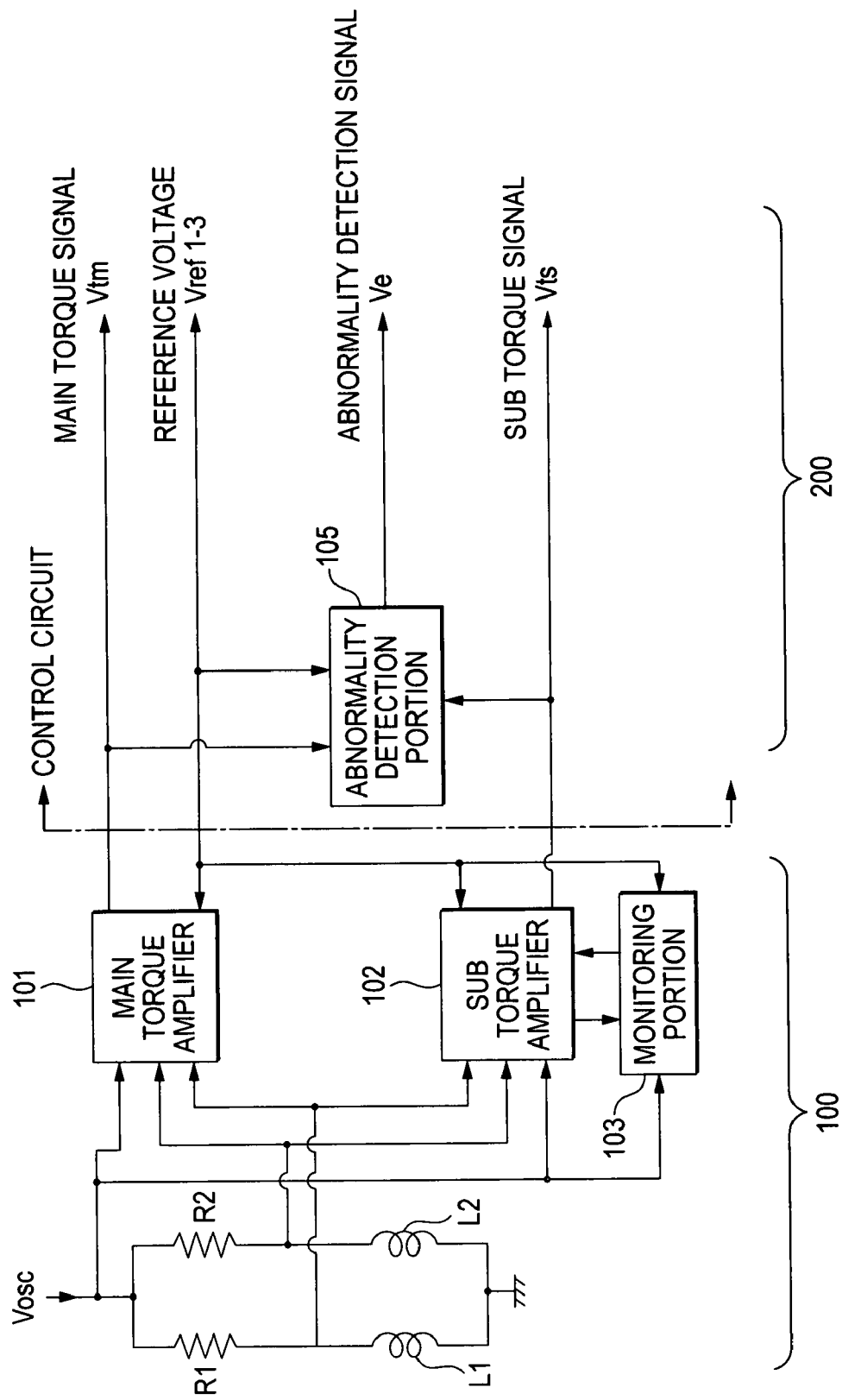
FIG. 6 is a block diagram illustrating the configuration of a conventional torque sensor.

FIG. 4 is a timing chart illustrating the reference voltage $V_{ref}$ (which has the values $V_{ref1}$ to $V_{ref3}$), and also illustrating the main torque signal $V_{tm}$, and the sub torque signal $V_{ts}$, which are detected by the abnormality detection portion 15, in a self-diagnosis mode of the monitoring portion 13 when the monitoring portion 13 itself is normal. FIG. 5 is a timing chart illustrating the reference voltage $V_{ref}$ (which has the values $V_{ref1}$ to $V_{ref3}$), and also illustrating the main torque signal $V_{tm}$, and the sub torque signal $V_{ts}$ When the monitoring portion 13 itself is abnormal.

First, the main torque signal $V_{tm}$, and the sub torque signal $V_{ts}$, which are detected by the abnormality detection portion 15, When the monitoring portion itself 13 is normal, are described below by referring to FIG. 4.

In step 1, the reference voltage is set at the first reference voltage value $V_{ref1}$ ($V_{ref1}$: 3.3 V (a normal value)) The main torque signal $V_{tm}$, whose level is 2.5 V, and the sub torque signal $V_{ts}$, whose level is also 2.5 V, are detected, so that the above condition (1) is met. Thus, the abnormality detection portion 15 determines that the monitoring portion 13 is normal.

This process proceeds to step 2 after a time period of 45 ms has elapsed since the abnormality detection operation is commenced. In step 2, the reference voltage is set at the second reference voltage value $V_{ref2}$ ($V_{ref2}$: 5.0 V (an abnormal value)). The main torque signal $V_{tm}$, whose level is 4.7 V, and the sub torque signal $V_{ts}$, whose level is 0.0 V, are detected, so that the above condition (2) is met. Thus, the abnormality detection portion 15 determines that the monitoring portion 13 is normal.

In this step, 0.0 V is detected as the level of the sub torque signal $V_{ts}$. This is because the monitoring portion 13 is designed so that 0.0 V is detected as the level of the sub torque signal $V_{ts}$, When the reference voltage $V_{ref}$ has an abnormal value, as described above.

The process proceeds to step 3 after a time period of 90 ms has elapsed since the abnormality detection operation is commenced. In step 3, the reference voltage is set at the third reference voltage value $V_{ref3}$ ($V_{ref3}$: 0.0 V (an abnormal value)) in the monitoring portion 13. The main torque signal $V_{tm}$, whose level is 0.0 V, and the sub torque signal $V_{tm}$, whose level is 0.0 V, are detected, so that the above condition (3) is met. Thus, the abnormality detection portion 15 determines that the monitoring portion 13 is normal.

In this step, 0.0 V is detected as the level of the sub torque signal $V_{ts}$. This is because the monitoring portion 13 is designed to output a voltage of 0.0 V is outputted as the level of the sub torque signal $V_{ts}$ When the reference voltage $V_{ref}$ has an abnormal value, as described previously.

Next, the main torque signal $V_{tm}$, and the sub torque signal $V_{ts}$, which are detected by the abnormality detection portion 15, When the monitoring portion itself 13 is abnormal, are described below by referring to FIG. 5.

In step 1, the reference voltage is set at the first reference voltage value $V_{ref1}$ ($V_{ref1}$: 3.3 V (a normal value)) The main torque signal $V_{tm}$, whose level is 2.5 V, and the sub torque signal $V_{ts}$, whose level is also 2.5 V, are detected, so that the above condition (1) is met. Thus, the abnormality detection portion 15 tentatively determines that the monitoring portion 13 is normal.

This process proceeds to step 2 after a time period of 45 ms has elapsed since the abnormality detection operation is commenced. In step 2, the reference voltage is set at the second reference voltage value $V_{ref2}$ ($V_{ref2}$: 5.0 V (an abnormal value)). The main torque signal $V_{tm}$, whose level is 3.8 V, and the sub torque signal $V_{ts}$, whose level is also 3.8V, are detected. When the monitoring portion 13 is normal, because the reference voltage $V_{ref}$ has an abnormal value, so that a voltage of 0.0 V is outputted as the voltage represented by the sub torque signal $V_{ts}$, as described previously. However, the voltages respectively represented by the main torque signal $V_{tm}$ and the sub torque signal $V_{ts}$, are equal to each other. This indicates that the monitoring portion 13 is abnormal. At that time, the above condition (2) is not satisfied. Thus, the abnormality detection portion 15 determines that the monitoring portion 13 is abnormal.

Incidentally, occurrence of a shortcircuit between the main torque signal line and the sub torque signal line is indicated by the fact that the voltages respectively represented by the main torque signal $V_{tm}$ and the sub torque signal $V_{ts}$ are equal to each other.

This process proceeds to step 3 after a time period of 90 ms has elapsed since the abnormality detection operation is commenced. In step 3, the reference voltage is set at the third reference voltage value $V_{ref3}$ ($V_{ref3}$: 0.0 V (an abnormal value)) in the monitoring portion 13. The main torque signal $V_{tm}$, whose level is 0.0 V, and the sub torque signal $V_{ts}$, whose level is 0.0 V, are detected, so that the above condition (3) is satisfied. Thus, the abnormality detection portion 15 tentatively determines that the monitoring portion 13 is normal.

When the reference voltage $V_{ref}$ is fixedly set at 3.3 V (a normal value), the main torque signal $V_{tm}$ and the sub torque signal $V_{ts}$, both of which has a level of 2.5 V, regardless of whether the monitoring portion 13 is normal or abnormal, even when a shortcircuit occurs between the main torque signal line and the sub torque signal line. This voltage value represented by each of the output signals $V_{tm}$ and $V_{ts}$ is equal to that represented by each of the signals $V_{tm}$ and $V_{ts}$ when no shortcircuit occurs between the main torque signal line and the sub torque signal line. Thus, a shortcircuit occurring between the main torque signal line and the sub torque signal line cannot be detected. This is a reason for changing the reference voltage $V_{ref}$ in three levels.

Incidentally, the upper limit value $V_{thu}$ ($V_{thu}$=4.7) and the lower limit value $V_{thd}$ ($V_{thd}$=0.3) of the criterion value (or threshold value) for the main torque signal $V_{tm}$ and the sub torque signal $V_{ts}$ and the predetermined value $V_c$ ($V_c$=5), which are employed in the self-diagnosis process that has been described in the foregoing description and that is performed by the monitoring portion 13, are only an example of the criterion value (or threshold value). The criterion value (or threshold value) according to the invention is not limited thereto. It has been described in the foregoing description that the entire time to be elapsed in each of steps 1, 2, and 3 is 45 ms, and that when an abnormal state continues for 10 ms at abnormality determination, the abnormality detection portion 15 determines that the torque sensor is abnormal. However, these are only examples of the elapsed time and the abnormal state continuance time, which are preliminarily set. Further, the elapsed time and the abnormal state continuance time to be preliminarily set according to the invention are not limited thereto.

[Shortcircuit Detection Process by Shortcircuit Failure Detection Portion]

Next, a process of detecting a shortcircuit occurring between the main torque signal line and the sub torque signal line, which is performed by the shortcircuit failure detection portion 16, is described below.

A shortcircuit detection process is performed in the test mode immediately after the ignition key is turned to the ON-position. Similarly to the self-diagnosis process performed by the monitoring portion 13 itself, which has been described previously, the shortcircuit detection process is performed by setting the reference voltage at the value $V_{ref2}$ (=5.0 V (an abnormal value)) in the monitoring portion 13.

The shortcircuit failure detection portion 16 compares the main torque signal $V_{tm}$ outputted from the main torque amplifier 11 with the sub torque signal $V_{ts}$ outputted from the sub torque amplifier 12. That is, when the reference voltage having the second reference voltage value $V_{ref2}$ (=5.0 V (an abnormal value)) to the monitoring portion 13, a signal representing a voltage, whose value $V_{tm}$ is equal to or less than 4.7V, is outputted as the main torque signal when the monitoring portion 13 is normal. However, the reference voltage value $V_{ref2}$ is an abnormal value. Thus, a sub torque signal $V_{ts}$, whose value is forcibly set to be 0, is outputted from the sub torque amplifier 16. Consequently, the voltage levels respectively represented by the main torque signal $V_{tm}$ and the sub torque signal $V_{ts}$ inputted to the shortcircuit failure detection portion 16 should differ from each other.

Thus, when the voltage levels respectively represented by the main torque signal $V_{tm}$ and the sub torque signal $V_{ts}$ inputted to the shortcircuit failure detection portion 16 are equal to each other ($V_{tm}=V_{ts}$), the shortcircuit failure detection portion 16 can determine that a shortcircuit occurs between the main torque signal line and the sub torque signal line. When determining that a shortcircuit occurs between the main torque signal line and the sub torque signal line, the shortcircuit failure detection portion 16 outputs a detection signal $V_{sh}$ indicating occurrence of a shortcircuit between the signals lines. When receiving the detection signal $V_{sh}$ representing a shortcircuit failure occurring between the signal lines, the control circuit changes a control mode into a fail safe mode.

Also, it is advisable that when receiving the detection signal $V_{sh}$ representing a shortcircuit failure occurring between the signal lines, the control circuit informs a driver of occurrence of a shortcircuit failure by an alarm lamp or the like to promote repair of the failure. Also, it is advisable to save a history of occurrence of a shortcircuit failure by, for example, recording the history in a memory and to utilize the history as information for maintenance, and for recurrence prevention and future development at a manufacturing department.

Also, When a shortcircuit failure occurrences, it is advisable to continue to perform a steering assist control operation based on a main torque signal to facilitate conveyance of a vehicle to a service station. In this case, it is advisable to change the control mode into a fail safe mode, in which a steering assist force is halved, so as to make a driver to notice the shortcircuit failure and as to promote the driver to repair.

That is, when a failure of the torque sensor is detected at initial diagnosis performed by the control unit just after the ignition key is turned to the ON-position, it is advisable to inform a driver of the abnormality of the torque sensor by an alarm lamp or the like, and to determine whether the failure is a shortcircuit failure occurring between signal lines. Additionally, when the shortcircuit failure is occurred between the signal lines, it is advisable to change the control mode into the fail safe mode, in which a steering assist force is halved, and to continue to perform a steering assist control operation according to a main torque signal. Because the steering assist force is halved, a handle operation is less responsive than usual. However, the vehicle can be conveyed to the service station. In this case, it is advisable that whether the main torque signal used for steering assist represents an appropriate value is determined according to whether a voltage level represented by the main torque signal is within a range between the upper limit value and the lower limit value of the threshold value.

As is apparent from the foregoing description, the shortcircuit failure detection portion 16 performs a shortcircuit detection process that is similar to the self-diagnosis process performed by the monitoring part 13. Therefore, the shortcircuit detection process performed by the shortcircuit failure detection portion 16 described in the foregoing description can be performed by the monitoring part 13. In this case, it is advisable to provide a shortcircuit detection mode as one of test modes, and to set, when the monitoring part 13 performs the shortcircuit detection process, the reference voltage $V_{ref2}$ (=5.0V (corresponding to an abnormality value)) in the monitoring part 13.

The torque sensor having the shortcircuit detection portion according to the invention has been described above as a torque sensor applied to an electric power steering apparatus. Needless to say, this torque sensor can be applied to a torque sensor for use in a general industrial machine, in addition to a vehicle steering apparatus.

The torque sensor according to the invention is adapted to detect torque from impedance changes respectively generated in the two detection coils. A failure condition is caused in an abnormality detection portion by intentionally and sequentially changing the reference voltage between the normal reference voltage (corresponding to the normal value) and the other reference voltage (corresponding to an abnormal value), which differs from the normal reference voltage. According to a signal outputted from the abnormality detection portion at that time, a shortcircuit failure occurring between the main torque signal line and the sub torque signal line can be detected, though such a shortcircuit failure cannot be detected by the conventional failure detection unit.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. An electric power steering apparatus, comprising a torque detection unit comprising:
    a torque detection element comprising a pair of detection coils of which impedances change in accordance with torque;
    a torque detection portion comprising a monitoring portion which monitors the torque detection element; and
    a shortcircuit failure detection portion which detects a shortcircuit failure occurring between a main torque signal line and a sub torque signal line of the detection coils, wherein
    the shortcircuit failure detection portion detects the shortcircuit failure occurring between the main torque signal line and the sub torque signal line by comparing a main torque signal and a sub torque signal, which are outputted from the torque detection portion when an abnormal condition is intentionally set in the monitoring portion.

2. The electric power steering apparatus according to claim 1, wherein the torque detection unit further comprises a reference voltage generation circuit which outputs a particular reference voltage, which differs from a standard reference voltage, to the monitoring portion and when a test mode, in which a torque detection circuit is tested, is set, the abnormal condition is intentionally set in the monitoring portion by setting the particular reference voltage therein.

3. The electric power steering apparatus according to claim 2, wherein the particular reference voltage, which is set in the monitoring portion when the test mode is set, exceeds the standard reference voltage.

4. The electric power steering apparatus according to claim 1, wherein the monitoring portion is configured so that when an abnormal condition is set therein by intentionally setting the particular reference voltage therein, the sub torque signal line is grounded.

5. The electric power steering apparatus according to claim 1, wherein the shortcircuit failure detection portion determines that the shortcircuit failure occurring between the main torque signal line and the sub torque signal line occurs in a case where a test mode is set, where an abnormal condition is set in the monitoring portion by setting a particular reference voltage exceeding a standard reference voltage therein, and where a main torque signal voltage and a sub torque signal voltage outputted from the torque detection portion are equal to each other.

6. The electric power steering apparatus according to claim 1, wherein when the shortcircuit failure is detected, the torque detection unit changes a mode thereof into a fail safe mode.

* * * * *